(No Model.)

O. ELCE.
COMBINED GUARD AND WEEDER.

No. 310,037. Patented Dec. 30, 1884.

WITNESSES:
Chas. Nida
C. Sedgwick

INVENTOR:
O. Elce
BY Munn & Co
ATTORNEYS.

UNITED STATES PATENT OFFICE.

OSCAR ELCE, OF PARKER, DAKOTA TERRITORY.

COMBINED GUARD AND WEEDER.

SPECIFICATION forming part of Letters Patent No. 310,037, dated December 30, 1884.

Application filed September 29, 1884. (No model.)

*To all whom it may concern:*

Be it known that I, OSCAR ELCE, of Parker, in the county of Turner and Territory of Dakota, have invented certain new and useful Improvements in Combined Guards and Weeders for Cultivators, of which the following is a full, clear, and exact description.

Reference is to be had to the accompanying drawings, forming part of this specification, in which similar letters of reference indicate corresponding parts in all the figures.

Figure 1:
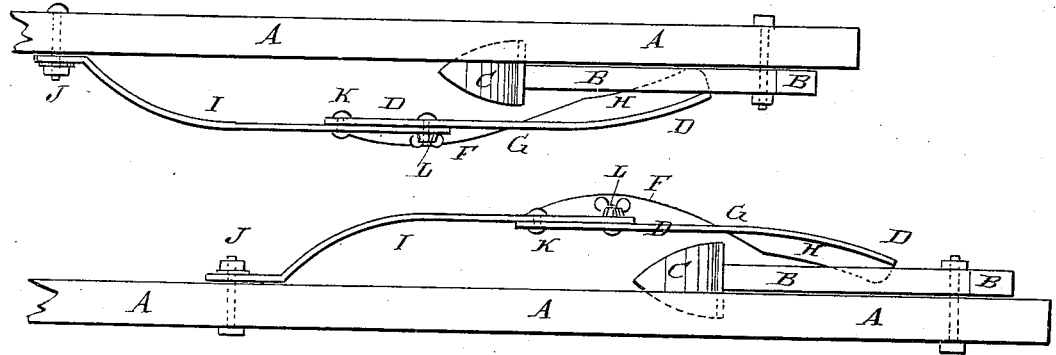
Figure 2:
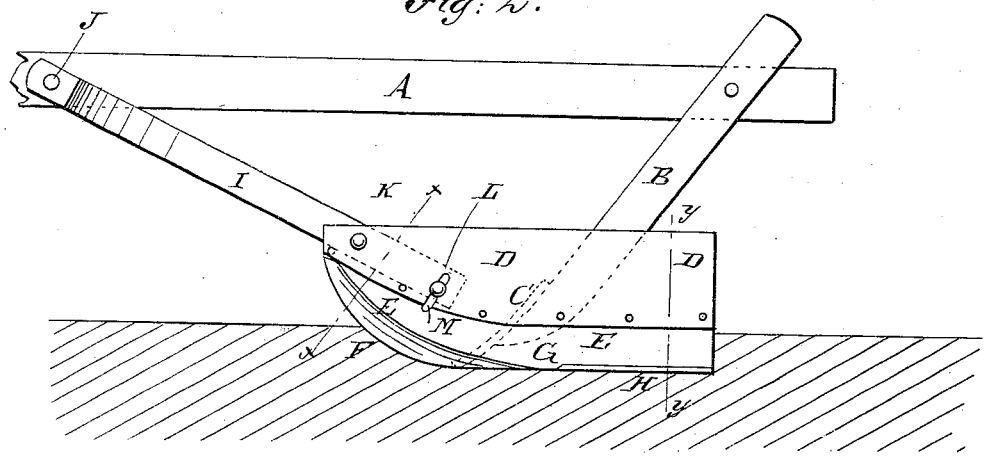
Figure 4:
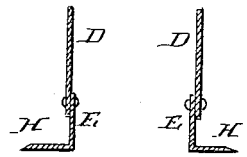
Figure 3:
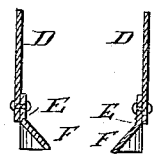

Figure 1 is a plan view of my improvement shown as applied to the right and left hand beams of a cultivator. Fig. 2 is a side elevation of the right-hand guard and weeder and its beam. Fig. 3 is a sectional end elevation of the forward parts of the right and left hand guards and weeders, as indicated by the line $x\ x$, Fig. 2. Fig. 4 is a sectional end elevation of the rear parts of the right and left hand guards and weeders, as indicated by the line $y\ y$, Fig. 2.

The object of this invention is to protect small plants from clods and lumps thrown by the forward shovels, and to destroy and remove weeds and grass that may be growing near the said plants.

The invention consists in a combined guard and weeder constructed with a sheet-iron upper plate and a steel lower plate, having its lower forward part inclined toward the plants, its middle part vertical, and upon its rear part a horizontal flange projecting from the plants. To the forward end of the guard and weeder is attached the rear end of a bar, the forward end of which is attached to or connected with the cultivator-beam, as will be hereinafter fully described.

A represents the beams of an ordinary cultivator. B are the forward standards, and C are the forward shovels. D is a plate, of sheet-iron, about eight inches high and of any convenient or suitable length. The forward part of the plate D is straight, or nearly so, and has its lower edge inclined or rounded, as shown in Fig. 2. The rear part of the plate D is curved outward, as shown in Fig. 1. To the lower edge of the plate D is riveted a narrow plate, E, of steel, the forward part of the lower edge of which is inclined or rounded, and its lower forward part, F, is inclined inward or toward the plants, as shown in Figs. 1 and 3. The middle part, G, of the plate E is vertical, and its outwardly-curved rear part has an outwardly-projecting horizontal flange, H, formed upon it, as shown in Figs. 1, 2, and 4. With this construction, as the cultivator is drawn forward the inclined lower forward part, F, of the plate E runs close to the plants and bends and pushes the weeds and grass back from the said plants, while the flange H cuts off the roots and destroys the said weeds and grass, and the curved rear parts of the plates D E push the said weeds and grass below the forward shovels, forming a low ridge, which the rear shovels (not shown in the drawings) level down. The guard and weeder is drawn by the bar I, the forward end of which is secured by a bolt, J, to the beam A, or to a support attached to the said beam. The bar I, at a little distance from its rear end, is secured to the forward end of the plate D by a bolt or rivet, K, and is secured at its rear end to the said plate by a clamping-bolt, L, which passes through a hole in the said bar, and through a slot, M, in the said plate, so that by loosening the said clamping-bolt L the guard and weeder can be adjusted to work at any desired depth in the ground.

Having thus described my invention, what I claim as new, and desire to secure by Letters Patent, is—

1. A combined guard and weeder for cultivators, constructed substantially as herein shown and described, and consisting of the sheet-iron plate D and the steel plate E, having its lower forward part, F, inclined toward the plants, its middle part, G, vertical, and upon its rear part a horizontal flange, H, projecting from the plants, to adapt the said guard and weeder to remove and destroy weeds and grass growing close to the plants, as set forth.

2. The combination, with a cultivator beam, A, of the adjustable bar I, the sheet-iron plate D, and the steel plate E, having an outwardly-projecting lower forward part, F, a vertical middle part, G, and a horizontal inwardly-projecting flange, H, upon its rear part, substantially as herein shown and described, whereby weeds and grass growing close to the plants will be removed and destroyed, as set forth.

OSCAR ELCE.

Witnesses:
CHAS. F. HACKETT,
CHARLES B. ELCE.